United States Patent
Hatori et al.

(10) Patent No.: US 9,195,001 B2
(45) Date of Patent: Nov. 24, 2015

(54) SPOT SIZE CONVERTER, OPTICAL TRANSMITTER, OPTICAL RECEIVER, OPTICAL TRANSCEIVER, AND METHOD OF MANUFACTURING SPOT SIZE CONVERTER

(71) Applicants: FUJITSU LIMITED, Kawasaki-shi, Kanagawa (JP); NEC Corporation, Minato-ku, Tokyo (JP)

(72) Inventors: Nobuaki Hatori, Tsukuba (JP); Masashige Ishizaka, Tokyo (JP); Takanori Shimizu, Tokyo (JP)

(73) Assignees: FUJITSU LIMITED, Kawasaki (JP); NEC CORPORATION, Tokyo (JP)

( * ) Notice: Subject to any disclaimer, the term of this patent is extended or adjusted under 35 U.S.C. 154(b) by 270 days.

(21) Appl. No.: 13/727,927

(22) Filed: Dec. 27, 2012

(65) Prior Publication Data

US 2013/0170807 A1  Jul. 4, 2013

(30) Foreign Application Priority Data

Dec. 28, 2011 (JP) ................................. 2011-289548

(51) Int. Cl.
*G02B 6/036* (2006.01)
*G02B 6/122* (2006.01)
*G02B 6/30* (2006.01)
(Continued)

(52) U.S. Cl.
CPC .............. *G02B 6/036* (2013.01); *G02B 6/1228* (2013.01); *G02B 6/305* (2013.01); *G02B 6/136* (2013.01); *G02B 6/30* (2013.01); *G02B 2006/12097* (2013.01); *G02B 2006/12195* (2013.01)

(58) Field of Classification Search
CPC ........ G02B 6/1228; G02B 6/305; G02B 6/30; G02B 6/136; G02B 2006/12195; G02B 2006/12097
USPC .................................................. 385/129–132
See application file for complete search history.

(56) References Cited

U.S. PATENT DOCUMENTS 4,991,926 A * 2/1991 Pavlath ........................... 385/27
5,586,209 A * 12/1996 Matsuura et al. ............... 385/45
(Continued)

FOREIGN PATENT DOCUMENTS

CN 101276068 A 10/2008
CN 101546015 A 9/2009
(Continued)

OTHER PUBLICATIONS

European Search Report dated Apr. 18, 2013, in counterpart European Application No. 12199219.
(Continued)

*Primary Examiner* — Ryan Lepisto
*Assistant Examiner* — Guy Anderson
(74) *Attorney, Agent, or Firm* — Kratz, Quintos & Hanson, LLP

(57) ABSTRACT

The spot size converter includes a first cladding layer, a first core layer and a second core layer arranged side by side on the first cladding layer so as to extend from a first end which receives/outputs light along a direction from the first end toward a second end, a third core layer which is disposed on the first cladding layer between the first and second core layers, is a member different from the first and second core layers, and extends to the second end along the direction from the first end toward the second end, and a second cladding layer disposed on the first, second, and third core layers.

11 Claims, 15 Drawing Sheets

(51) Int. Cl.
*G02B 6/12* (2006.01)
*G02B 6/136* (2006.01)

(56) References Cited

U.S. PATENT DOCUMENTS

| | | | |
|---|---|---|---|
| 5,627,928 A * | 5/1997 | Matsuura et al. | 385/45 |
| 6,052,397 A * | 4/2000 | Jeon et al. | 372/46.01 |
| 6,269,211 B1 * | 7/2001 | Hatayama et al. | 385/129 |
| 6,393,185 B1 * | 5/2002 | Deacon | 385/50 |
| 6,396,984 B1 * | 5/2002 | Cho et al. | 385/43 |
| 6,937,797 B2 * | 8/2005 | Mizuno et al. | 385/43 |
| 7,068,870 B2 * | 6/2006 | Steinberg et al. | 385/14 |
| 7,079,727 B1 * | 7/2006 | Little | 385/28 |
| 7,317,853 B2 * | 1/2008 | Laurent-Lund et al. | 385/43 |
| 8,538,213 B2 * | 9/2013 | Uchida et al. | 385/43 |
| 8,718,432 B1 * | 5/2014 | Heideman et al. | 385/131 |
| 2002/0110328 A1 * | 8/2002 | Bischel et al. | 385/49 |
| 2004/0057667 A1 | 3/2004 | Yamada | |
| 2005/0084991 A1 * | 4/2005 | Lee et al. | 438/21 |
| 2008/0044126 A1 * | 2/2008 | Costa et al. | 385/14 |
| 2010/0316343 A1 * | 12/2010 | Yamamoto | 385/129 |
| 2011/0090770 A1 | 4/2011 | Iwanabe et al. | |
| 2012/0155805 A1 * | 6/2012 | Doerr | 385/37 |
| 2012/0155806 A1 * | 6/2012 | Doerr et al. | 385/37 |
| 2012/0230635 A1 | 9/2012 | Yoshida | |
| 2013/0188910 A1 * | 7/2013 | Tokushima et al. | 385/28 |
| 2013/0229809 A1 * | 9/2013 | Hatori et al. | 362/311.01 |

FOREIGN PATENT DOCUMENTS

| | | |
|---|---|---|
| JP | 2004-151700 A1 | 5/2004 |
| JP | 2009-36877 A | 2/2009 |
| WO | WO 2005/017588 A1 | 2/2005 |
| WO | 2011/036818 A1 | 3/2011 |

OTHER PUBLICATIONS

Office Action dated Jun. 23, 2015 issued in corresponding Japanese Patent Application No. 2011-289548 with English translation.

* cited by examiner

SPOT SIZE CONVERTER, OPTICAL TRANSMITTER, OPTICAL RECEIVER, OPTICAL TRANSCEIVER, AND METHOD OF MANUFACTURING SPOT SIZE CONVERTER

CROSS-REFERENCE TO RELATED APPLICATION

This application is based upon and claims the benefit of priority of the prior Japanese Patent Application No. 2011-289548, filed on Dec. 28, 2011, the entire contents of which are incorporated herein by reference.

FIELD

The present invention relates to a spot size converter, an optical transmitter, an optical receiver, an optical transceiver, and a method of manufacturing a spot size converter.

BACKGROUND

Hitherto, a planar light circuit (PLC) formed on a substrate is used in the optical communication field. The planar light circuit is used mainly as a silica-based material of an optical waveguide. For example, a planar light circuit of an array waveguide grating (AWG), a splitter, or the like is used as a backbone part in optical communication.

Recently, in an attempt to realize a smaller system by mounting an active optical device and a passive optical device on a common PLC substrate is being made. For example, a novel optical device such as a wavelength-variable light source in which a compound semiconductor amplifier (SOA) is hybrid-packaged on a silica-based PLC is being developed.

However, as a demanded function is becoming more complicated and sophisticated, the device dimension and consumption power of the planar optical circuit are increasing. Consequently, it is becoming difficult to improve the function or performance of an optical circuit using the conventional silica-based PLC.

Accordingly, a technique of forming an optical waveguide on an SOI (Silicon On Insulator) substrate using the silicon microfabrication technique such as a silicon wire waveguide or a photonic crystal (PC) is being studied. Development of a small backbone part characterized by low power consumption is being examined using the silicon microfabrication technique.

A silicon wire waveguide has a core layer formed by silicon and a cladding layer made of $SiO_2$ or its dielectric. Since the relative index difference between silicon and $SiO_2$ or its dielectric is larger than that of PLC, the width of an optical waveguide or bending radius of an optical waveguide can be made smaller than that of a PLC. Therefore, the dimensions of a silicon wire waveguide using the silicon microfabrication technique can be made smaller than those of a conventional PLC. By using such a silicon wire waveguide, a small-sized optical circuit can be realized. The reason will be described below.

In a conventional silica-based PLC, the relative index difference between a core layer and a cladding layer is at most about 5%, and the limit of the bending radius is about 500 µm. On the other hand, in the silicon wire waveguide, the relative index difference is 40% or higher, and the bending radius can be reduced to a few microns. However, when the relative index difference is increased, the size of the core layer has to be reduced in order to satisfy a single mode parameter of propagation light.

It causes the difference in the spot size between an optical fiber or another waveguide device and a silicon wire waveguide, so that loss of light occurs.

To solve the problem, a method of reducing the spot size of light which is incident on the silicon wire waveguide has been proposed. For example, it is proposed to reduce the width of a waveguide which guides incident light to the silicon wire waveguide in a tapered shape.

Japanese Laid-open Patent Publication No. 2004-151700

SUMMARY

However, in a region in which the spot size is reduced to 10 microns to a few microns, the sensitivity of the spot size to the width of the core layer in the waveguide is high. It is consequently difficult to manufacture the core layer with proper dimension precision.

To solve the problem, a spot size conversion waveguide in which the first core layer in the tapered waveguide is covered with a second core layer formed of polymer is proposed. In the method, however, the second core layer formed of polymer is stacked around the first core layer and the second core layer is etched in a waveguide shape. Consequently, there are many points to be noted in controling of the thickness and quality (refractive index) of the second core layer, process precision, and the like, and the manufacture process is also complicated.

According to an aspect of an embodiment of a spot size converter disclosed in the specification, the spot size converter includes: a first cladding layer; a first core layer and a second core layer arranged side by side on the first cladding layer so as to extend from a first end which receives/outputs light along a direction from the first end toward a second end; a third core layer which is disposed on the first cladding layer between the first and second core layers, is a member different from the first and second core layers, and extends to the second end along the direction from the first end toward the second end; and a second cladding layer disposed on the first, second, and third core layers.

According to an aspect of an embodiment of an optical transmitter disclosed in the specification, the optical transmitter includes: a substrate; a spot size conversion unit having a first cladding layer disposed on the substrate, a first core layer and a second core layer arranged side by side on the first cladding layer so as to extend from a first end which receives light along a direction from the first end toward a second end which outputs light, a third core layer which is disposed on the first cladding layer between the first and second core layers, is a member different from the first and second core layers, and extends to the second end along the direction from the first end toward the second end, and a second cladding layer disposed on the first, second, and third core layers; and a light generator disposed on the substrate and outputting light to the first end.

According to an aspect of an embodiment of an optical receiver disclosed in the specification, the optical receiver includes: a substrate; a spot size conversion unit having a first cladding layer disposed on the substrate, a first core layer and a second core layer arranged side by side on the first cladding layer so as to extend from a first end which outputs light along a direction from the first end toward a second end which receives light, a third core layer which is disposed on the first cladding layer between the first and second core layers, is a member different from the first and second core layers, and extends to the second end along the direction from the first end toward the second end, and a second cladding layer disposed on the first, second, and third core layers; and a photodetector disposed on the substrate and detecting light entered from the second end, propagated through the spot size conversion unit, and output from the first end.

According to an aspect of an embodiment of an optical transceiver disclosed in the specification, the optical transceiver includes: a first substrate; a first spot size conversion unit including a first cladding layer disposed on the first substrate, a first core layer and a second core layer arranged side by side on the first cladding layer so as to extend from a first end which receives light along a direction from the first end toward a second end which outputs light, a third core layer which is disposed on the first cladding layer between the first and second core layers, is a member different from the first and second core layers, and extends to the second end along the direction from the first end toward the second end, and a second cladding layer disposed on the first, second, and third core layers; a light generator disposed on the first substrate and outputting light to the first end; a second substrate; a second spot size conversion unit including a third cladding layer disposed on the second substrate, a fourth core layer and a fifth core layer arranged side by side on the third cladding layer so as to extend from a third end which outputs light along a direction from the third end toward a fourth end which inputs light, a sixth core layer which is disposed on the third cladding layer between the fourth and fifth core layers, is a member different from the fourth and fifth core layers, and extends to the fourth end along the direction from the third end toward the fourth end, and a fourth cladding layer disposed on the fourth, fifth, and sixth core layers; and a photodetector disposed on the second substrate and detecting light which enters from the fourth end, propagated through the second spot size conversion unit, and output from the third end.

According to an aspect of an embodiment of a method of manufacturing a spot size converter disclosed in the specification, the method includes the steps of: forming a first core layer and a second core layer arranged side by side on a first cladding layer so as to extend from a first end along a direction from the first end toward a second end; forming a third core layer which is disposed on the first cladding layer between the first and second core layers, is a member different from the first and second core layers, and extends to the second end along the direction from the first end toward the second end; and forming a second cladding layer disposed on the first, second, and third core layers.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a preferred first embodiment of an optical device having a spot size converter disclosed in the specification will be described with reference to the drawings. The technical scope of the present invention is not limited to the embodiments but includes the invention described in the scope of claims and its equivalents.

Figure 1:
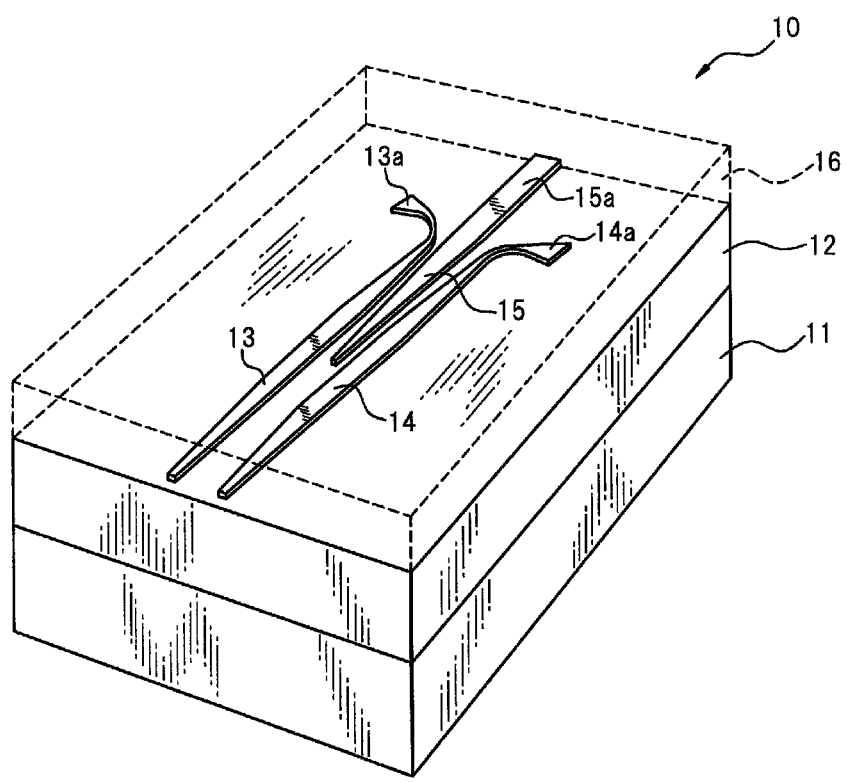
FIG. 1 is a perspective view depicting a first embodiment of an optical device disclosed in the specification.
Figure 2:
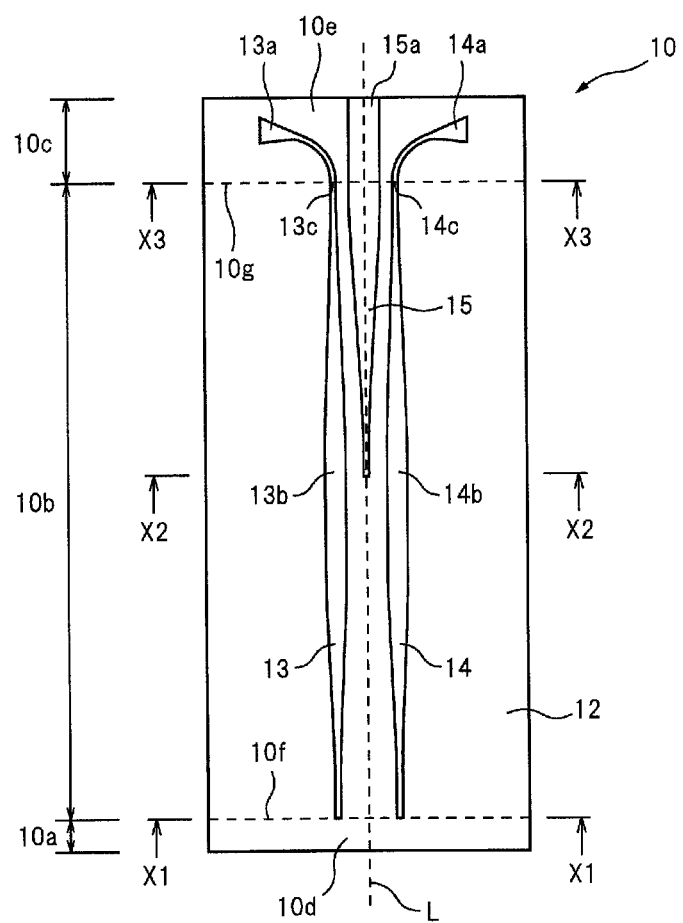
FIG. 2 is a plan view of the optical device depicted in FIG. 1.
Figure 3:
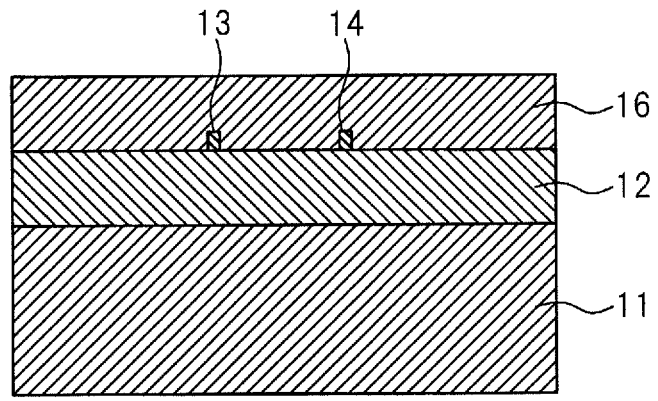
FIG. 3 is a cross section taken along line X1-X1 of FIG. 2.
Figure 4:
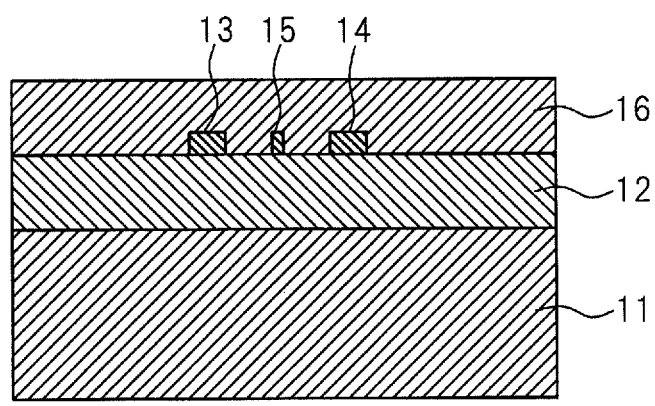
FIG. 4 is a cross section taken along line X2-X2 of FIG. 2.
Figure 5:
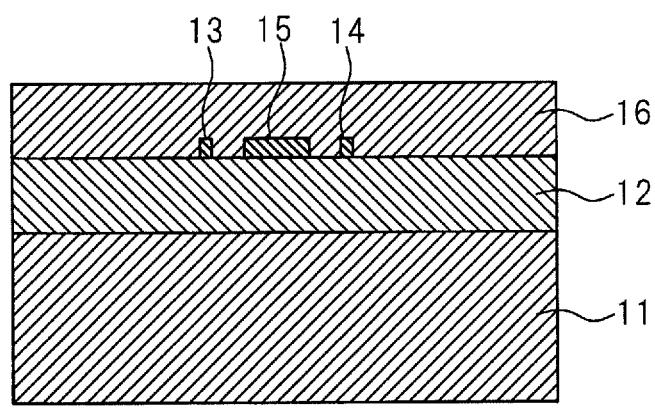
FIG. 5 is a cross section taken along line X3-X3 of FIG. 2.

FIG. 1 is a perspective view depicting a first embodiment of an optical device disclosed in the specification. FIG. 2 is a plan view of the optical device depicted in FIG. 1. FIG. 3 is a cross section taken along line X1-X1 of FIG. 2. FIG. 4 is a cross section taken along line X2-X2 of FIG. 2. FIG. 5 is a cross section taken along line X3-X3 of FIG. 2.

An optical device 10 of the embodiment receives light from the outside, converts the spot size of the received light to smaller spot size, and outputs light having smaller spot size. On the contrary, the optical device 10 receives light from the outside, converts the spot size of the received light to larger spot size, and outputs light having larger spot size.

As depicted in FIG. 2, the optical device 10 has one end 10d which receives/outputs light and the other end 10e which outputs/receives light. In the optical device 10, input light propagates from one end 10d to the other end 10e or propagates from the other end 10e to the one end 10d.

To the one end 10d, for example, another optical device which propagates light having large spot size such as an optical fiber is optically coupled. To the other end 10e, for example, another optical device which propagates light having small spot size such as a silicon wire waveguide is optically coupled.

The optical device 10 has, in order from the one end 10d to the other end 10e, a first extension unit 10a, a spot size conversion unit 10b, and a second extension unit 10c.

First, the spot size conversion unit 10b will be described and, then, the first extension unit 10a and the second extension unit 10c will be described.

The spot size conversion unit 10b has a first end 10f which receives/outputs light from/to the first extension unit 10a, and a second end 10g which receives/outputs light from/to the second extension unit 10c.

The spot size conversion unit 10b has a semiconductor substrate 11 and a lower cladding layer 12 disposed on the substrate 11. The spot size conversion unit 10b also has first and second core layers 13 and 14 arranged on the lower cladding layer 12 along a direction extending from a first end 10f which receives/outputs light toward a second end 10g. The spot size conversion unit 10b also has a third core layer 15 disposed on the lower cladding layer 12 between the first and second core layers 13 and 14 and extending in a direction from the first end 10f toward the second end 10g. The third core layer 15 is a member different from the first and second core layers 13 and 14, and the first and second core layers 13 and 14 are formed so as to be apart from each other. Preferably, the refractive index of the lower cladding layer 12 is lower than that of the first, second, and third core layers 13, 14, and 15 from the viewpoint of confining propagating light in each of the core layers. In the specification, the direction from the first end 10f toward the second end 10g coincides with the direction of light propagating in the optical device 10.

The spot size conversion unit 10b has an upper cladding layer 16 on the first, second, and third core layers 13, 14, and 15 so as to bury the layers. Preferably, the refractive index of the upper cladding layer 16 is lower than that of the first, second, and third core layers 13, 14, and 15 from the viewpoint of confining propagating light in each of the core layers. In FIG. 1, only the contour of the upper cladding layer 16 is indicated by the chain line. In FIG. 2, the upper cladding layer 16 is not depicted so that the structure can be easily understood.

In the spot size conversion unit 10b, light which is supplied from the first extension unit 10a to the first end 10f simultaneously propagates in the first and second core layers 13 and 14 toward the second end 10g. The light propagating in the first and second core layers 13 and 14 is coupled in the third core layer 15 in some midpoint and travels. In such a manner, the light which enters the spot size converter 10b propagates through the third core layer 15 and the spot size of the light is converted to smaller size. In the second end 10g, the light having the small spot size is output from the third core layer 15 to the second extension unit 10c.

In the spot size conversion unit 10b, the light which is incident on the second end 10g from the second extension unit 10c propagates through the third core layer 15 toward the first end 10f. The light propagating through the third core layer 15 couples to the first and second core layers 13 and 14 in some midpoint and travels. In such a manner, the light which enters the spot size converter 10b simultaneously propagates through the first and second core layers 13 and 14 and the spot size of the light is converted to larger size. In the first end 10f, the light having the large spot size is output from the first and second core layers 13 and 14 to the first extension unit 10a.

Hereinafter, the first and second core layers 13 and 14 will be described more specifically.

The first and second core layers 13 and 14 are different members and are apart from each other. Preferably, the first and second core layers 13 and 14 have the relation of line symmetry with respect to line L of center between the core layers from the viewpoint of equalizing mode profiles of light propagating through the core layers. In the embodiment, the first and second core layers 13 and 14 are formed symmetrically with respect to the center line L.

As depicted in FIGS. 3 to 5, the first and second core layers 13 and 14 are apart from each other in the horizontal direction. The horizontal direction is a direction orthogonal to the stack direction of the layers and orthogonal to the light propagation direction.

In the direction from the first end 10f toward the second end 10g, the sectional area of the first and second core layers 13 and 14 increases, reaches the maximum value and, after that, decreases. The first core layer 13 has a part 13b in which the sectional area is the maximum for predetermined length. Similarly, the second core layer 14 has a part 14b in which the sectional area is the maximum for predetermined length.

In the embodiment, the thickness of the first and second core layers 13 and 14 is constant. Therefore, the width of the first and second core layers 13 and 14 increases to the maximum value in the direction from the first end 10f to the second end 10g and, after that, decreases. The width of the part 13b having the maximum value of the sectional area in the first core layer 13 is constant, and the width of the part 14b having the maximum value of the sectional area in the second core layer 14 is also constant. The width of the first and second core layers 13 and 14 is the dimension in the direction orthogonal to the direction from the first end 10f toward the second end 10g. This applies to the width of the third core layer 15 which will be described later.

In the embodiment, the width of the first and second core layers 13 and 14 gradually increases in the direction from the first end 10f toward the parts 13b and 14b.

The sectional area of the first and second core layers 13 and 14 is the minimum in positions 13c and 14c in the direction from the first end 10f toward the second end 10g. In the embodiment, the first and second core layers 13 and 14 have the minimum width in the positions 13c and 14c.

In the embodiment, the width of the first and second core layers 13 and 14 gradually decreases in the direction from the parts 13b and 14b toward the second end 10g.

Hereinafter, the third core layer 15 will be described more specifically.

The third core layer 15 is disposed in the center position between the first and second core layers 13 and 14.

The third core layer 15 is disposed so as to extend from the parts 13b and 14b in which the sectional area of the first and second core layers 13 and 14 is the maximum toward the second end 10g in the direction from the first end 10f toward the second end 10g. The start point of the third core layer 15 may be any of the positions of the parts 13b and 14b having predetermined length.

Preferably, the sectional area of the third core layer 15 increases in the part where the sectional area of the first and second core layers 13 and 14 decreases in the direction from the first end 10f toward the second end 10g. In the embodiment, the thickness of the third core layer 15 is constant, and the width of the third core layer 15 gradually increases in the part where the width of the first and second core layers 13 and 14 decreases in the direction from the first end 10f toward the second end 10g, becomes the maximum around the second end 10g and, after that, becomes constant.

Preferably, the sectional area of the third core layer 15 becomes the maximum in the position where the sectional area of the first and second core layers 13 and 14 is the minimum in the direction from the first end 10f toward the second end 10g. In the embodiment, the sectional area of the third core layer 15 becomes the maximum in the positions 13c and 14c in which the sectional area of the first and second core layers 13 and 14 is the minimum in the direction from the first end 10f toward the second end 10g.

Preferably, the distance between the third core layer 15 and the first and second core layers 13 and 14 is set so that mode fields of propagation light overlap.

Next, the first extension unit 10a will be described.

The first extension unit 10a is formed by stacking the substrate 11, the lower cladding layer 12, and the upper cladding layer 16 so as to extend to the outside from the first end 10f of the spot size conversion unit 10b.

In the first extension unit 10a, the first, second, and third core layers 13, 14, and 15 do not extend.

When the first extension unit 10a which does not have the first, second, and third core layers 13, 14, and 15 is provided, at the time of forming an end face of the one end 10d by dry etching the optical device 10 from above, the influence on shape precision caused by variations in etching rates between the upper and lower cladding layers 12 and 16 and the first to third core layers 13, 14, and 15 is prevented.

Next, the second extension unit 10b will be described.

The second extension unit 10b is formed by stacking the substrate 11, the lower cladding layer 12, and the upper cladding layer 16 so as to extend to the outside from the second end 10g of the spot size conversion unit 10b.

In the second extension unit 10b, the third core layer 15 extends from the second end 10g of the spot size conversion unit 10b to the other end 10e, thereby forming a third core extension unit 15a. The third core extension unit 15a extends while having the same width as that of the third core layer 15 in the second end 10g.

In the second extension unit 10c, the first core extension unit 13a is formed so as to extend toward the other end 10e with the increasing distance from the third core extension unit 15a. The first core extension unit 13a extends while its width becomes larger than that of the first core layer 13 at the second end 10g. Similarly, in the second extension unit 10c, the second core layer 14 extends and the second core extension unit 14a is formed.

At the time of manufacturing the optical device 10, the first core extension unit 13a prevents a part on the second end 10g side in the first core layer 13 formed on the lower cladding layer 12 from being come off from the lower cladding layer 12. The second core extension unit 14a has a similar function. In the case where there is no such a concern, the first core extension unit 13a or the second core extension unit 14a may not be formed.

Figure 6:
FIG. 6 is a diagram depicting the profile of a mode field which propagates in the optical device of the first embodiment depicted in FIG. 2.
Figure 6:
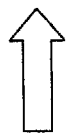
Figure 6:
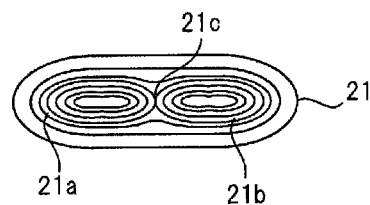
Figure 6:
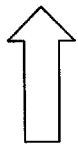
Figure 6:
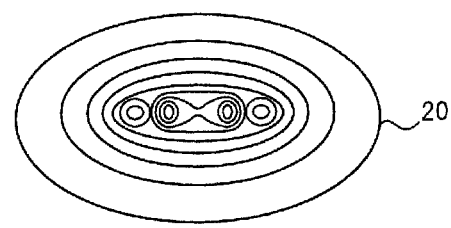

Referring now to FIG. 6, a state where light incident on the one end 10d propagates through the optical device 10 will be described.

First, light having a large spot size is incident on the one end 10d of the optical device 10 from the outside. The light incident on the one end 10d propagates through the first extension unit 10a and enters the first end 10f of the spot size conversion unit 10b.

The light which enters the first end 10f propagates through the first and second core layers 13 and 14 which are apart from each other in the horizontal direction.

FIG. 6 depicts a mode profile 20 of a field of light propagating in the section taken along line X1-X1 of FIG. 2. The section taken along line X1-X1 of FIG. 2 is depicted in FIG. 3. Each of mode profiles of the field of propagating light depicted in FIG. 6 is a result of solving a Maxwell equation by numerical computation using the finite element method under a predetermined boundary value condition. In a mode profile 20, an annular line indicates a distribution of the same field intensity. The inner the annular line is, the higher the field intensity is. This explanation is also applied to other mode profiles in FIG. 6.

At the first end 10f of the spot size conversion unit 10b, the outer shape of the mode profile 20 of the field of the light propagating simultaneously in the first and second core layers 13 and 14 which are apart from each other in the horizontal direction has a flat ellipse shape.

On the other hand, spread in the perpendicular direction of the field of light propagating in the first and second core layers 13 and 14 is suppressed as compared with that in the horizontal direction. The perpendicular direction of the field of light is a direction orthogonal to the horizontal direction.

Since the width of each of the first and second core layers 13 and 14 is small, the field of light propagating in each of the core layers largely penetrates in the upper and lower cladding layers 12 and 16.

The dimensions of the first and second core layers 13 and 14 which are apart from each other in the horizontal direction and the interval between the layers are set so that light propagating in the first and second core layers 13 and 14 form a single mode of light propagation.

From the first end 10f toward the second end 10g, the sectional area of the light propagating in the first and second core layers 13 and 14 increases, and the light is confined in each of the core layers and separated.

FIG. 6 is a diagram depicting a mode profile 21 of a field of propagating light in the section taken along line X2-X2 of FIG. 2. The section taken along line X2-X2 of FIG. 2 is depicted in FIG. 4.

In the parts 13b and 14b having the largest sectional area in the first and second core layers 13 and 14, the mode profile 21 of the field of the propagating light is roughly divided in two parts 21a and 21b, and the light is confined in each of the core layers.

At this time, in a center part 21c of the two parts 21a and 21b, penetration of the field of propagating light is small. The start of the third core layer 15 is positioned in the center part 21c.

When the start point of the third core layer 15 is disposed in the center part 21c, sensing of the appearance of the third core layer 15 by the light propagating in each of the first and second core layers 13 and 14 can be suppressed. Consequently, the influence of the appearance of the third core layer 15 exerted on the field of two lights which are separated can be reduced.

The wider the interval between the first and second core layers 13 and 14 is, the more the intensity of the field of light in the center part between the core layers can be reduced. However, in the direction from the first end 10f toward the second end 10g, the smaller the change in the interval between the first and second core layers 13 and 14 is, the more the loss of propagating light is suppressed and one light field profile can be separated to two parts. From this viewpoint, spread of the interval between the first and second core layers 13 and 14 is regulated.

The ratio of light which propagates through the first and second core layers 13 and 14 and is coupled to the third core layer 15 gradually increases in the direction from the first end 10f toward the second end 10g, and the light spot size decreases. The reason is that the sectional area of the first and second core layers 13 and 14 decreases from the parts 13a and 14b toward the second end 10g whereas the sectional area of the third core layer 15 increases in the direction from the first end 10f toward the second end 10g. As the sectional area of the first and second core layers 13 and 14 decreases, the field of light propagating in the first and second core layers 13 and 14 penetrates to the outside. The field of the light penetrating to the outside is coupled to the third core layer 15 whose sectional area increases.

From the viewpoint of promoting coupling of the light propagating in the first and second core layers 13 and 14 to the third core layer 15, preferably, the refractive index of the third core layer 15 is set to be higher than that of the first and second core layers 13 and 14. From the viewpoint of manufacturing the optical device 10, the first, second, and third core layers 13, 14, and 15 may be formed by using the same material.

The light propagating in the first and second core layers 13 and 14 shifts almost perfectly to the third core layer 15 in the positions 13c and 14c where the sectional area of the first and second core layers 13 and 14 becomes the minimum. The sectional area of the third core layer 15 becomes the maximum in the positions 13c and 14c in the direction from the first end 10f toward the second end 10g. The sectional area of the third core layer 15 is the maximum for predetermined length around the second end 10g.

FIG. 6 depicts a mode profile 22 of the field of propagating light in the section taken along line X3-X3 of FIG. 2. The cross section taken along line X3-X3 of FIG. 2 is depicted in FIG. 5. The field of the light propagating in the spot size conversion unit 10b is distributed around the third core layer 15 as a center.

In such a manner, the spot size of light output from the second end 10g of the spot size conversion unit 10b is converted to a size smaller than the size of the light entered from the first end 10f.

In the light propagating in the spot size conversion unit 10b, an optically discontinuous state occurs in the position where the third core layer 15 appears and the positions 13c and 14c in which the sectional area of the first and second core layers 13 and 14 is the minimum. Reduction of a mode mismatch which may be caused by the optically discontinuous state in each of the two positions will now be described.

Figure 7:
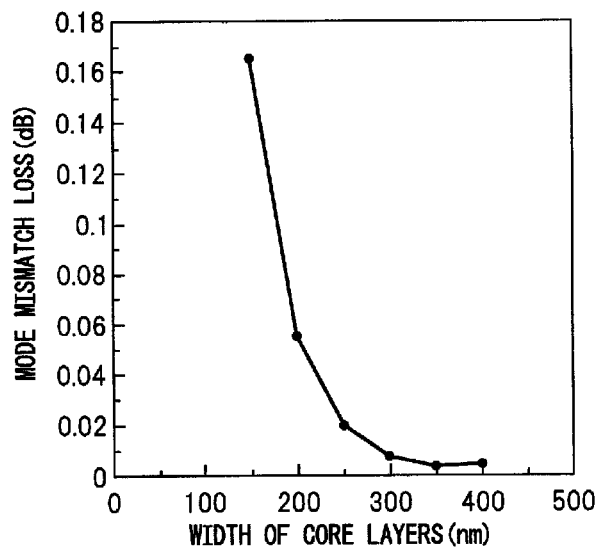
FIG. 7 is a diagram depicting the relation between mode mismatch loss and width of first and second core layers in the cross section taken along line X2-X2 of FIG. 2.

FIG. 7 is a diagram depicting the relation between a mode mismatch loss and width of the first and second core layers in the cross section taken along line X2-X2 of FIG. 2. The line X2-X2 of FIG. 2 corresponds to the position where the third core layer 15 appears. FIG. 7 is a result of solving a Maxwell equation by numerical computation using the finite element method under a predetermined boundary value condition. The width of the third core layer 15 in the line X2-X2 of FIG. 2 is set to 100 nm.

It is understood from the computation result of FIG. 7 that the width of the first and second core layers 13 and 14 is preferably set to three times or more (in this case, 300 nm or larger), more preferably, four times or more (in this case 400 nm or larger) as large as the width of the third core layer 15 from the viewpoint of reducing an excessive loss of propagating light due to a mode mismatch loss to 0.01 dB or less.

Figure 8:
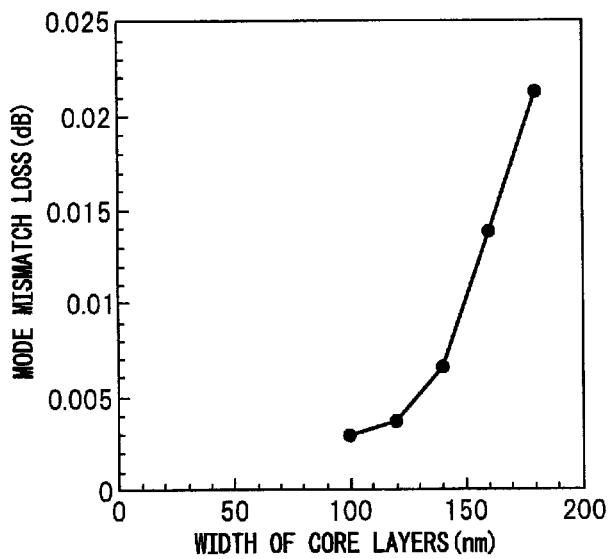
FIG. 8 is a diagram depicting the relation between mode mismatch loss and width of the first and second core layers in the cross section taken along line X3-X3 of FIG. 2.

FIG. 8 is a diagram depicting the relation between mode mismatch loss and width of the first and second core layers in the cross section taken along line X3-X3 of FIG. 2. The line X3-X3 of FIG. 2 corresponds to the positions 13c and 14c in which the sectional area of the first and second core layers 13 and 14 becomes the minimum. FIG. 8 is a result of solving a Maxwell equation by numerical computation using the finite element method under a predetermined boundary value condition. The width of the third core layer 15 in the line X3-X3 of FIG. 2 is set to 480 nm.

It is understood from the computation result of FIG. 8 that the width of the first and second core layers 13 and 14 is preferably set to ¼ or less (in this case, 120 nm or less), more preferably, ⅙ or less (in this case 80 nm or less) of the width of the third core layer 15 from the viewpoint of reducing an excessive loss of propagating light due to a mode mismatch loss to 0.005 dB or less.

In the case where light enters from the second end 10g and output from the first end 10f in the spot size conversion unit 10g, light propagating in the third core layer 15 is coupled to the first and second core layers 13 and 14 and travels. In this case, the propagation direction of the light propagating in the optical device 10 becomes opposite, the spot size of incident light is converted to a larger size, and the resultant light is output. With respect to the profile of the field of the propagating light, the explanation made with reference to FIG. 6 is properly applied.

The material of the optical device 10 of the embodiment will now be described.

As the substrate 11, for example, a silicon substrate can be used. As the lower cladding layer 12, for example, dielectric such as silicon oxide ($SiO_2$) or polymer can be used. As the first core layer 13, the second core layer 14, or the third core layer 15, for example, silicon can be used. As the upper cladding layer 16, dielectric such as silicon oxide ($SiO_2$) or dielectric such as polymer can be used.

When an SOI substrate is used, the substrate 11 is formed by using a silicon substrate in the SOI substrate, the lower cladding layer 12 is formed by using an insulating layer in the SOI substrate, and the first, second, and third core layers 13, 14, and 15 can be easily formed by using a silicon layer in the SOI substrate. By using such a silicon semiconductor material, the optical device 10 can be formed by using the microfabrication technique of the silicon semiconductor.

In the optical device 10 of the foregoing embodiment, the light coupling loss can be reduced. Since the spot size conversion unit 10b of the optical device 10 changes the field diameter of the light along the light propagation direction adiabatically (accompanying little power loss), the coupling loss of light between the first and second core layers 13 and 14 and the third core layer 15 is reduced. By converting the spot size of light by using such an optical device 10, for example, optical coupling between an optical fiber and a silicon wire waveguide can be performed efficiently. On the other hand, in a spot size converter having a conventional Y-branch structure, a loss of light due to reflection or the like caused by the branch part occurs, and there is limitation in reducing the coupling loss of light. However, in the optical device 10 of the embodiment, the coupling loss of light can be reduced beyond the conventional limitation.

In the optical device 10 of the embodiment, the first and second core layers 13 and 14 are disposed so as to be apart from each other in the horizontal direction, so that the spot size of light in the horizontal direction and that in the vertical direction can be controlled independently of each other to certain extent. For example, in an optical integrated device in which the optical device 10 is integrated with another device such as a light modulator or a light reception device, it is demanded to thin the upper cladding layer as much as possible from the viewpoint of simplifying the manufacture process, reducing the cost, and the like. In this case, at the time of enlarging the spot size of light, it is demanded to suppress enlargement in the vertical direction more than that in the horizontal direction. It is difficult to realize such conversion of the spot size in the conventional structure using one core layer. On the other hand, in the optical device 10 of the embodiment, the light coupling loss can be suppressed, and such a demand can be satisfied. Therefore, in the optical device 10 of the embodiment, in an optical integrated device having limitation in the thickness of the upper cladding layer, an input/output waveguide with little coupling loss can be realized.

Since the optical device 10 of the embodiment uses the first and second core layers 13 and 14 which are apart from each other in the horizontal direction, manufacture tolerance of precision on the sectional area (or width) of each of the first and second core layers 13 and 14 can be widened. The reason is that even if a manufacturing error occurs in the sectional area (or width) of each of the first and second core layers 13 and 14, the influence on the interval between the first and second core layers 13 and 14 is small. Therefore, in the optical device 10 of the embodiment, the manufacture yield can be improved, and the cost can be reduced.

Hereinafter, a second embodiment of the spot size converter will be described with reference to FIGS. 9 to 13. To the points which will not be described in the other embodiment, the above detailed description in the foregoing first embodiment is properly applied. The same reference numerals are designated for the same components.

Figure 9:
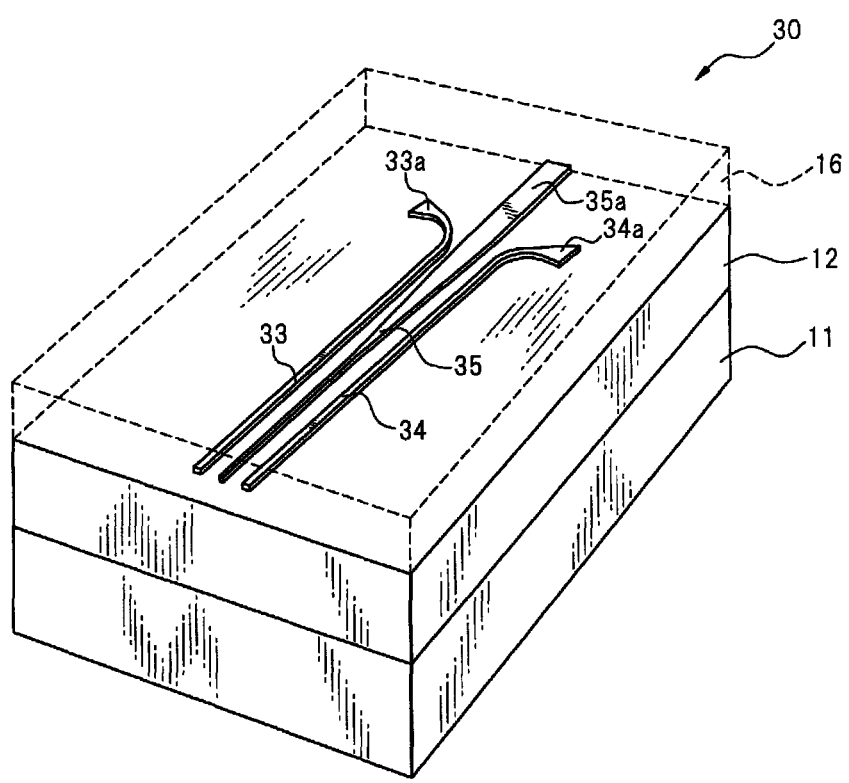
FIG. 9 is a perspective view depicting a second embodiment of an optical device disclosed in the specification.
Figure 10:
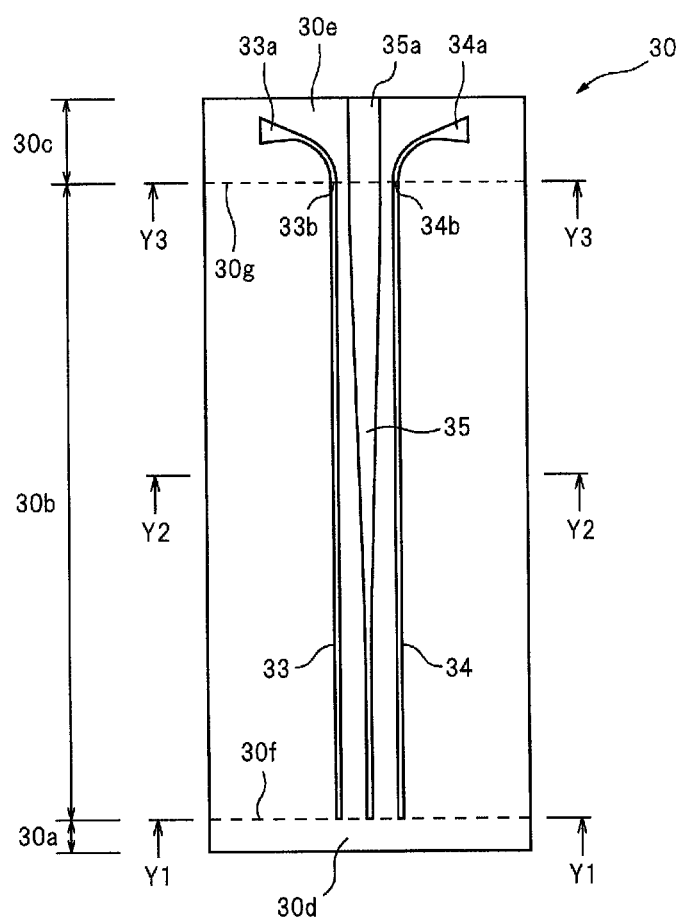
FIG. 10 is a plan view of the optical device depicted in FIG. 9.
Figure 11:
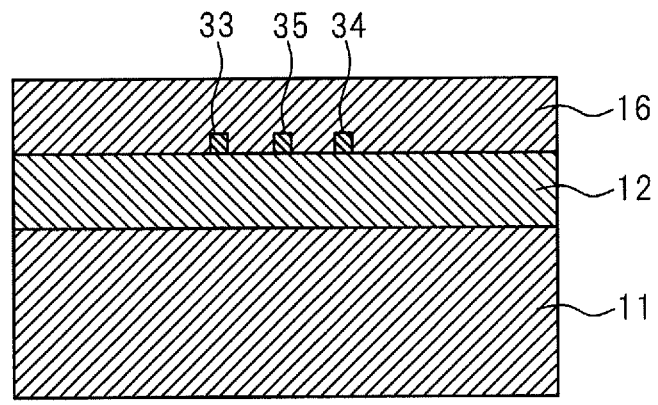
FIG. 11 is a cross section taken along line Y1-Y1 of FIG. 9.
Figure 12:
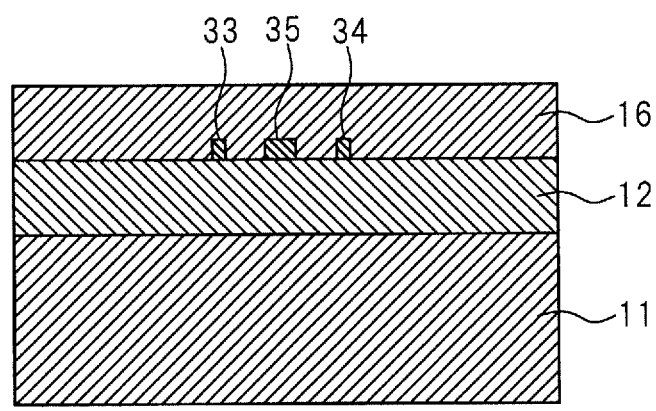
FIG. 12 is a cross section taken along line Y2-Y2 of FIG. 9.
Figure 13:
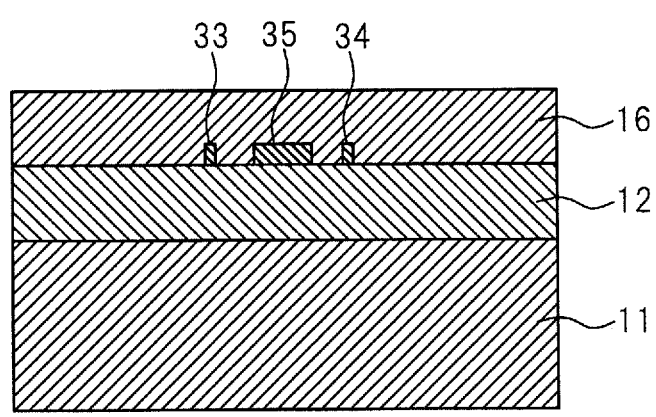
FIG. 13 is a cross section taken along line Y3-Y3 of FIG. 9.

FIG. 9 is a perspective view depicting a second embodiment of an optical device disclosed in the specification. FIG. 10 is a plan view of the optical device depicted in FIG. 9. FIG. 11 is a cross section taken along line Y1-Y1 of FIG. 9. FIG. 12 is a cross section taken along line Y2-Y2 of FIG. 9. FIG. 13 is a cross section taken along line Y3-Y3 of FIG. 9.

An optical device 30 has, in order from one end 30d to the other end 30e, a first extension unit 30a, a spot size conversion unit 30b, and a second extension unit 30c.

The spot size conversion unit 30b has a first end 30f which receives/outputs light from/to the first extension unit 30a, and a second end 30g which receives/outputs light from/to the second extension unit 30c.

The optical device 30 of the embodiment is different from the first embodiment with respect to the shapes of first, second, and third core layers 33, 34, and 35.

Preferably, the sectional area of the first and second core layers 33 and 34 is constant or decreases in a direction from a first end 30f toward a second end 30g. In the embodiment, the sectional area of the first and second core layers 33 and 34 decreases in a direction from the first end 30f toward the second end 30g. In the embodiment, the thickness of the first and second core layers 33 and 34 is constant, and the width of the first and second core layers 33 and 34 gradually decreases in a direction from the first end 30f toward the second end 30g.

The third core layer 35 is disposed on the lower cladding layer 12 in the center between the first and second core layers 33 and 34 so as to extend from the first end 30f to the second end 30g. In the direction from the first end 30f toward the second end 30g, the third core layer 35 extends from the same position as the first and second core layers 33 and 34 toward the second end 30g.

The sectional area of the third core layer 35 increases from the first end 30f toward the second end 30g, becomes the maximum around the second end 30g and, after that, becomes constant. In the embodiment, the thickness of the third core layer 35 is constant, the width of the third core layer 35 increases from the first end 30f toward the second end 30g, becomes the maximum around the second end 30g and, after that, becomes constant.

In the embodiment, light having a large spot size from the outside is incident on the one end 30d of the optical device 30. The light incident on the one end 30d propagates through the first extension unit 30a and enters the first end 30f of the spot size conversion unit 30b. Next, the light which enters the first end 30f propagates in the first, second, and third core layers 33, 34, and 35 which are disposed apart from one another in the horizontal direction.

The ratio of light which propagates through the first and second core layers 33 and 34 and is coupled to the third core layer 35 increases from the first end 30f toward the second end 30g, and the light spot size decreases. The reason is that the sectional area (or width) of the first and second core layers 33 and 34 decreases from the first end 30f toward the second end 30g whereas the sectional area (or width) of the third core layer 35 increases from the first end 30f toward the second end 30g.

The light propagating in the first and second core layers 33 and 34 shifts to the third core layer 35 almost completely in the positions 33b and 34b in which the sectional area (or width) of the first and second core layers 33 and 34 becomes the minimum. The sectional area (or width) of the third core layer 35 is the maximum in the positions 33b and 34b in the direction from the first end 30f toward the second end 30g.

The spot size of light output from the second end 30g of the spot size conversion unit 30b is converted to a spot size smaller than that of the light entered from the first end 30f.

The structure of the first and second extension units 30a and 30c of the embodiment is similar to that of the foregoing first embodiment.

In the spot size converter of the foregoing embodiment, the number of positions in which the optically discontinuous state occurs is smaller than that in the first embodiment, so that the coupling loss of light can be further reduced. The reason is, in the embodiment, the position in which the optically discontinuous state occurs is only the positions 33b and 34b in which the sectional area (or width) of the first and second core layers 33 and 34 becomes the minimum.

By the spot size converter of the embodiment, effects similar to those of the first embodiment can be obtained.

Hereinafter, an optical transmitter having a spot size conversion unit disclosed in the specification will be described.

Figure 14:
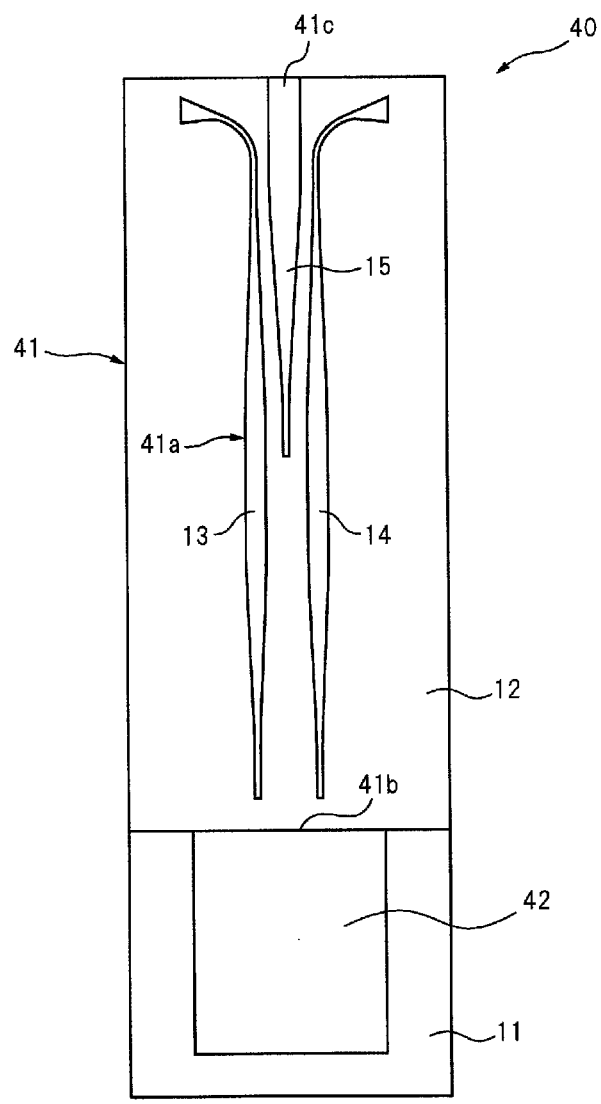
FIG. 14 is a diagram depicting a first embodiment of an optical transmitter disclosed in the specification.

FIG. 14 is a diagram depicting a first embodiment of an optical transmitter disclosed in the specification.

An optical transmitter 40 of the embodiment includes an optical device 41 having a spot size conversion unit 41a disposed on the substrate 11 and a light generator 42 which is disposed on the same substrate 11 and outputs light to one end 41b of the optical device 41.

The optical device 41 has the lower cladding layer 12 disposed on the substrate 11 and the first core layer 13, the second core layer 14, and the third core layer 15 disposed on the lower cladding layer 12. The structure of the optical device 41 is similar to that of the first embodiment of the optical device described above.

As the light generator 42, for example, a semiconductor laser can be used.

In the light transmitter 40, light output from the light generator 42 is incident on the one end 41b of the optical device 41 and is converted to light having a smaller spot size while propagating in the spot size conversion unit 41a, and the resultant light is output from the other end 41c to the outside.

The optical transmitter of the embodiment can convert the spot size of light generated by the light generator 42 to smaller size and output the resultant light while suppressing a coupling loss of the light.

Figure 15:
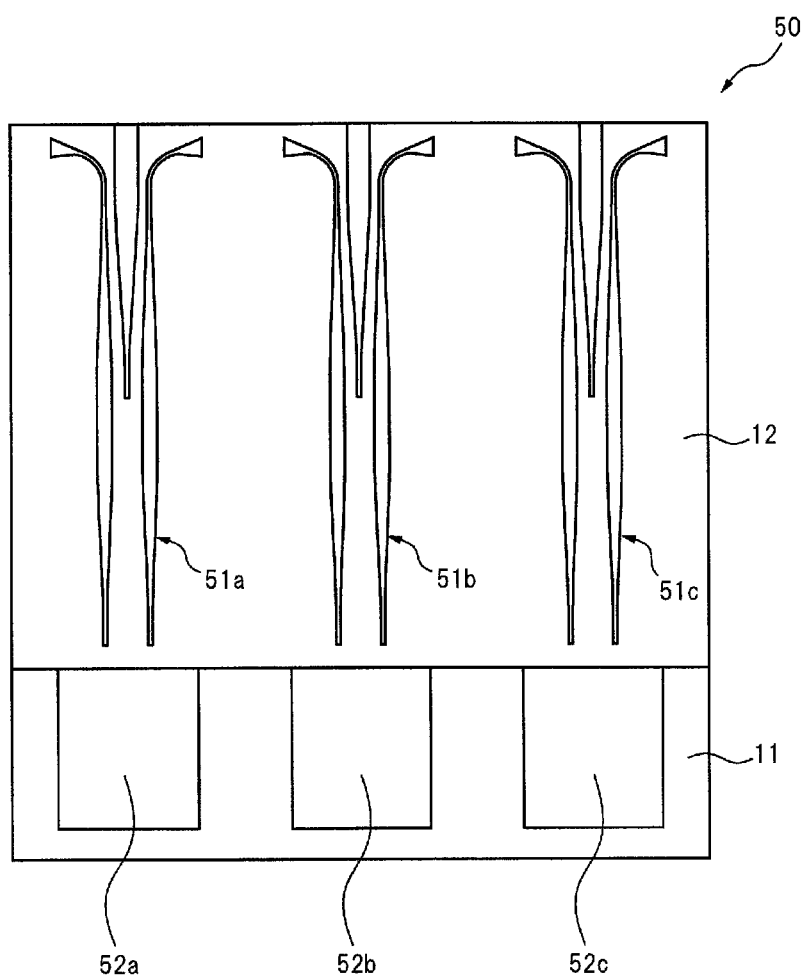
FIG. 15 is a diagram depicting a second embodiment of an optical transmitter disclosed in the specification.

FIG. 15 is a diagram depicting a second embodiment of an optical transmitter disclosed in the specification.

An optical transmitter 50 of the embodiment has a plurality of optical devices 51a, 51b, and 51c disposed side by side on the substrate 11. The optical devices 51a, 51b, and 51c are arranged in the horizontal direction with their light propagation directions matched. Each of the optical devices 51a, 51b, and 51c has a spot size conversion unit and has a structure similar to that of the first embodiment of the optical device.

The optical transmitter 50 has light generators 52a, 52b, and 52c corresponding to the optical devices 51a, 51b, and 51c, respectively. To each of the optical devices 51a, 51b, and 51c, light which is output from the corresponding light generator is supplied. The plurality of light generators 52a, 52b, and 52c are also disposed on the substrate 11.

The optical transmitter of the embodiment can output light signals whose optical spot size is reduced in parallel.

An optical transceiver having a spot size conversion unit disclosed in the specification will now be described.

Figure 16:
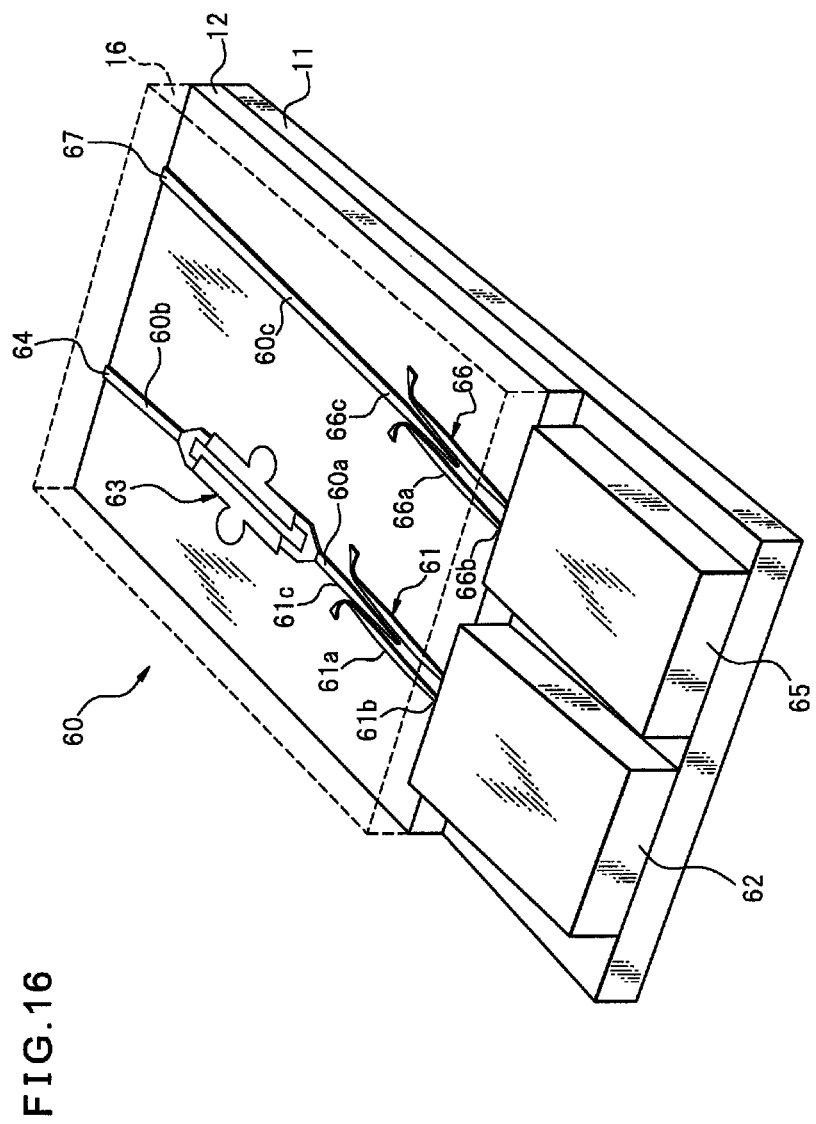
FIG. 16 is a diagram depicting an embodiment of an optical transceiver disclosed in the specification.

FIG. 16 is a diagram depicting an embodiment of an optical transceiver disclosed in the specification.

An optical transceiver 60 of the embodiment includes a first optical device 61 having a spot size conversion unit 61a disposed on the substrate 11 and a light generator 62 which is disposed on the same substrate 11 and outputs light to one end 61b of the first optical device 61. The structure of the first optical device 61 is similar to that of the first embodiment of the optical device.

The light whose spot size is converted to smaller size by the first optical device 61 is supplied from the other end 61c to a silicon wire waveguide 60a disposed on the lower cladding layer 12. The light incident on the silicon wire waveguide 60a propagates through the silicon wire waveguide 60a and enters a light modulator 63. As the light modulator 63, for example, a Mach-Zehnder modulator can be used.

The light modulator 63 modulates the incident light and outputs the modulated light to a silicon wire waveguide 60b disposed on the lower cladding layer 12. The silicon wire waveguide 60b propagates the incident light to an output unit 64.

The output unit 64 outputs the incident light to the outside.

The optical transceiver 60 has an input unit 67 which receives light from the outside.

Light received by the input unit 67 propagates in a silicon wire waveguide 60c disposed on the lower cladding layer 12. The light which propagates through the silicon wire waveguide 60c is incident on the other end 66c of a second optical device 66 which will be described later.

The optical transceiver 60 also includes the second optical device 66 having a spot size conversion unit 66a disposed on the substrate 11 and a photodetector 65 disposed on the same substrate 11 and detecting light which is received from the other end 66c and propagates in the spot size conversion unit 66a, and outputs from one end 66b of the second optical device 66. The second optical device 66 has the same upper cladding layer 16 as that in the first optical device 61.

The spot size of light propagated in the silicon wire waveguide 60c is converted to larger one by the spot size conversion unit 66a of the second optical device 66, and the resultant light is supplied to the photodetector 65.

In the optical transmitter of the embodiment, while suppressing coupling loss of light, the spot size of light generated by the light generator 62 can be converted to smaller size, and resultant light can be output. While suppressing coupling loss of light, the spot size of the incident light is converted to larger size, and resultant light can be detected.

A preferred embodiment of a method of manufacturing the spot size converter will be described below with reference to the drawings.

In the embodiment, a method of manufacturing the spot size conversion unit in the first embodiment of the optical device will be described.

Figure 17:
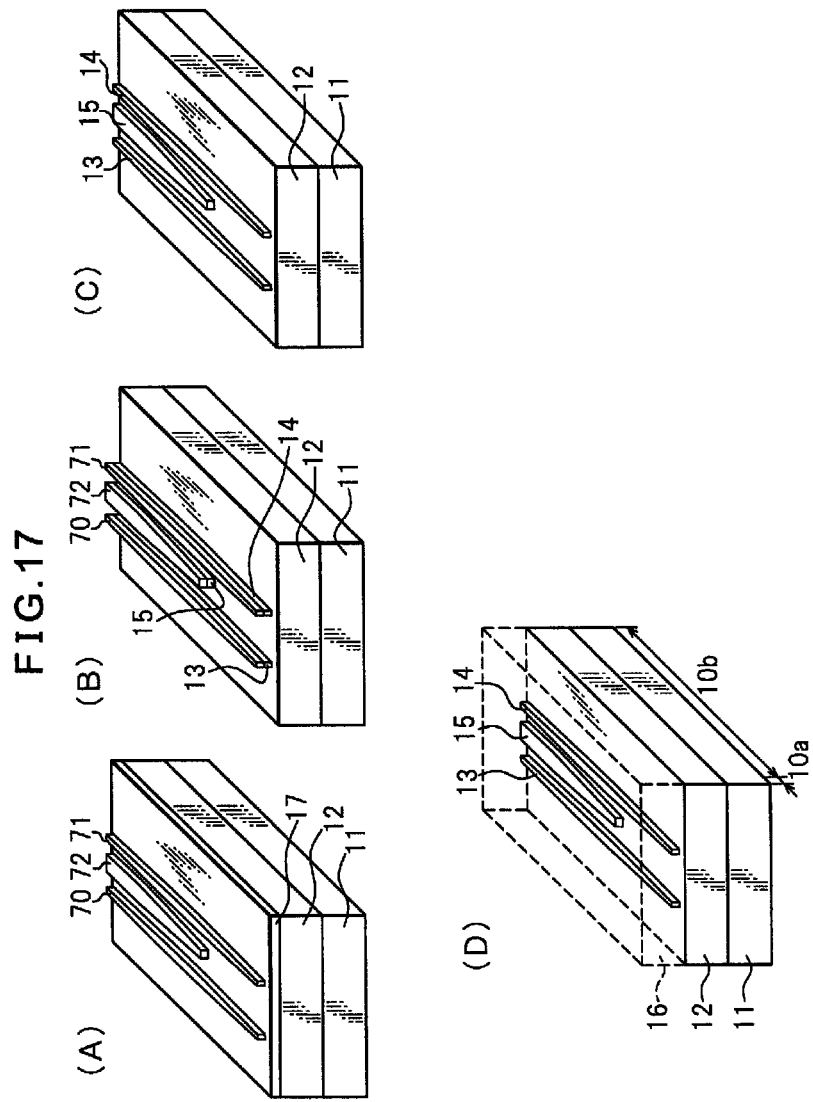
FIG. 17 is a diagram depicting an embodiment of a method of manufacturing a spot size converter disclosed in the specification.

First, as depicted in FIG. 17(A), on a core layer 17 of the semiconductor substrate 11 in which the core layer 17 and the lower cladding layer 12 are stacked, masks 70, 71, and 72 are formed by using the silicon microfabrication technique. In the embodiment, as the semiconductor substrate 11 in which the core layer 17 and the lower cladding layer 12 are stacked, an SOI (Silicon On Insulator) is used. Therefore, the substrate 11 is a silicon substrate, the lower cladding layer 12 is a silicon oxide ($SiO_2$) layer, and the core layer 17 is a single-crystal silicon layer. The material of the core layer 17 may be polycrystal or amorphous material. As the material of the lower cladding layer 12, a material other than silicon oxide ($SiO_2$) such as polymer may be used. The masks 70, 71, and 72 have shapes corresponding to the first, second, and third core layers, respectively, in the first embodiment of the optical device. The masks 70, 71, and 72 are formed as separate members. In the embodiment, the end of each of the masks 70, 71, and 72 is disposed on the inside of the periphery of the lower cladding layer 12 so that the first extension unit of the first embodiment of the optical device is formed.

As depicted in FIG. 17(B), using the silicon microfabrication technique, the core layer 17 is etched with the masks 70, 71, and 72 as masks to expose the surface of the lower cladding layer 12. The first, second, and third core layers 13, 14, and 15 are formed on the lower cladding layer 12. The first, second, and third core layers 13, 14, and 15 are formed as separate members.

Next, as depicted in FIG. 17(C), the masks 70, 71, and 72 are removed from the first, second, and third core layers 13, 14, and 15.

As depicted in FIG. 17(D), using the silicon microfabrication technique, the upper cladding layer 16 is formed on the first, second, and third core layers 13, 14, and 15 so as to bury the layers. In the embodiment, as the material of the upper cladding layer 16, silicon oxide ($SiO_2$) is used. As the material of the upper cladding layer 16, a material other than silicon oxide ($SiO_2$) such as polymer may be used.

According to the manufacturing method of the foregoing embodiment, using the silicon microfabrication technique, the optical device can be manufactured. In the embodiment, the core layer in the optical device is formed by a material of one kind. Without forming a composite core structure using oxynitride film, polymer, or the like as in the background art, the number of manufacturing processes can be reduced. Therefore, cost reduction by simplifying the manufacture process can be realized.

In the manufacturing method of the foregoing embodiment, by changing the shape of a mask, for example, the spot size conversion unit of the second embodiment of the optical device can also be manufactured.

In the present invention, the spot size converter, the optical transmitter, the optical receiver, the optical transceiver, and the method of manufacturing a spot size converter can be properly changed without departing from the gist of the present invention. The components of an embodiment can also be properly applied to another embodiment.

Figure 18:
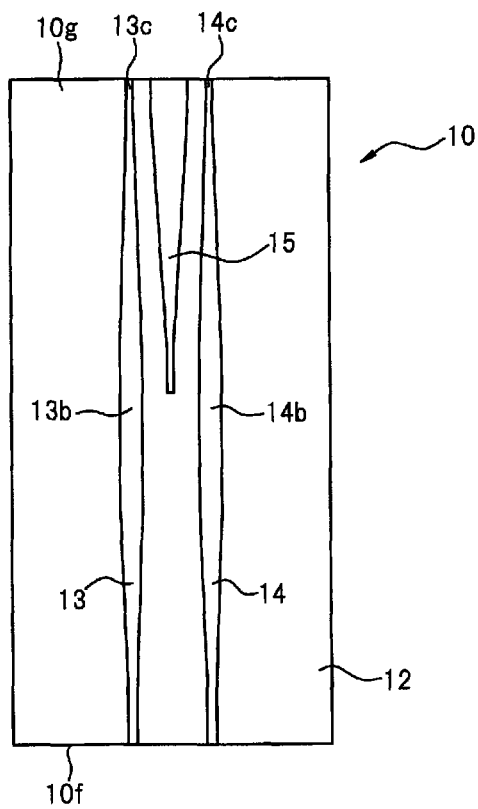
FIG. 18 is a diagram depicting another embodiment of the spot size converter disclosed in the specification.

For example, in the optical device of the first embodiment, the first and second extension units are disposed together with the spot size conversion unit. However, in the optical device, as depicted in FIG. 18, the first and second extension units may not be disposed. The optical device 10 depicted in FIG. 18 has a configuration similar to that of the spot size conversion unit 10b of the optical device of the first embodiment. Concretely, the optical device 10 depicted in FIG. 18 has the lower cladding layer 12, and the first and second core layers 13 and 14 disposed side by side on the lower cladding layer 12 so as to extend from the first end 10f along a direction from the first terminal 10f which receives/outputs light toward the second terminal 10g. The optical device 10 also includes the third core layer 15 which is disposed on the lower cladding layer 12 between the first and second core layers 13 and 14, is a member different from the first and second core layers 13 and 14, and extends to the second end 10g along the direction from the first end 10f toward the second end 10g, and an upper cladding layer (not depicted) disposed on the first, second, and third core layers 13, 14, and 15. Particularly, in the case where etching selectivity between the core layers 13, 14, and 15 and the lower cladding layer or the upper cladding layer is low, without providing the first extension unit, the influence on shape precision due to variations in etching rates is small.

Figure 19:
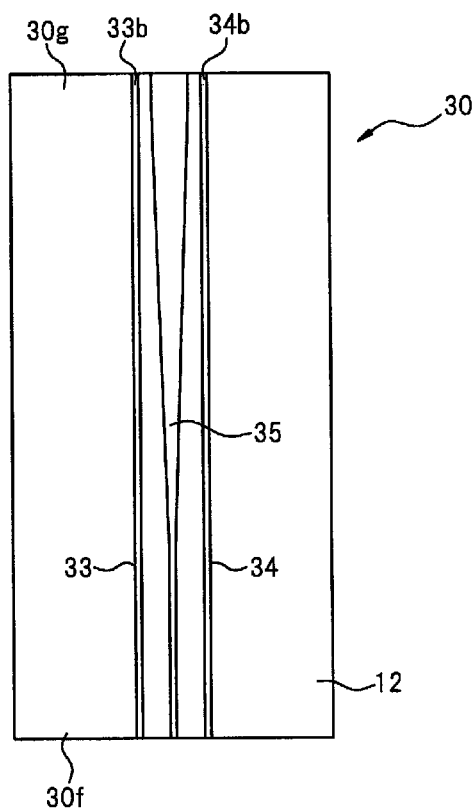
FIG. 19 is a diagram depicting further another embodiment of the spot size converter disclosed in the specification.

Similarly, in the optical device of the second embodiment, as depicted in FIG. 19, the first and second extension units may not be disposed. The optical device 30 depicted in FIG. 19 has a configuration similar to that of the spot size conversion unit 30b of the optical device of the second embodiment.

Figure 20:
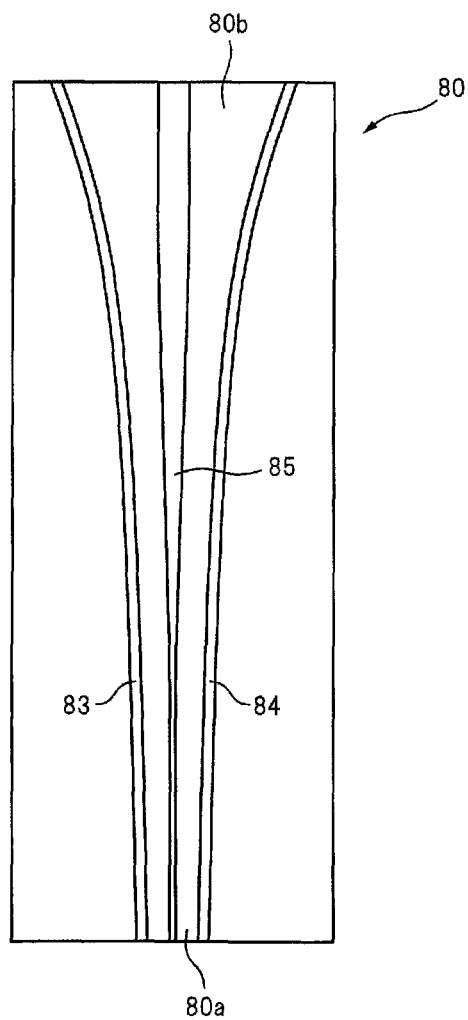
FIG. 20 is a diagram depicting further another embodiment of the spot size converter disclosed in the specification.

Although the first and second core layers 13 and 14 are disposed so as to extend from the first end 10f to the second end 10g in the first embodiment, the first and second core layers 13 and 14 may be disposed so as to extend before the second end 10g in the direction from the first end 10f toward the second end 10g. In the second embodiment of the spot size converter, the sectional area or width of the first and second core layers 33 and 34 decreases in the direction from the first end 30f in the optical device 30 toward the second end 30g. As depicted in FIG. 20, in an optical device 80, in a direction from one end 80a toward the other end 80b, the sectional area or width of first and second core layers 83 and 84 may be constant, the distance between the first core layer 83 and a third core layer 85 may be increased, and the distance between the second core layer 84 and the third core layer 85 may be increased.

Although the optical receiver having the spot size conversion unit is formed integrally with the optical transmitter in the above-described optical transceiver, the optical receiver having the spot size conversion unit may be an independent optical device. Further, although the optical transmitter and the optical receiver are disposed on the same substrate and the upper cladding layer and the lower cladding layer are integrally formed in the above-described optical transceiver, the optical transmitter and the optical receiver may be disposed on different substrates, and the upper and lower cladding layers may be formed as different members.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A spot size converter, comprising:
   a first cladding layer;
   a first core layer and a second core layer arranged side by side on the first cladding layer so as to extend from a first end which receives/outputs light along a direction from the first end toward a second end;
   a third core layer which is disposed on the first cladding layer between the first and second core layers, is a member different from the first and second core layers, and extends to the second end along the direction from the first end toward the second end; and
   a second cladding layer disposed on the first, second, and third core layers, wherein:
   a sectional area of the first and second core layers increases in the direction from the first end toward the second end, sectional area of the third core layer increases in a direction from the first end toward the second end, and the sectional area of the first and second core layers decreases in the direction from the first end toward the second end from the position where the sectional area of the first and second core layers is the maximum, and sectional area of the third core layer is the maximum in a position where sectional area of the first and second core layers is the minimum in the direction from the first end toward the second end.

2. The spot size converter according to claim 1, wherein the third core layer is centrally disposed between the first and second core layers.

3. The spot size converter according to claim 1, wherein the third core layer is disposed so as to extend from the position, as an initial point, where the sectional area of the first and second core layers is the maximum to the second end in the direction from the first end toward the second end.

4. The spot size converter according to claim 1, wherein the first and second core layers have relation of line symmetry with respect to center line between the core layers.

5. The spot size converter according to claim 1, wherein thickness of the first, second, and third core layers is constant.

6. The spot size converter according to claim 1, wherein the first and second cladding layers extend from the first end and an extension unit in which the first and second cladding layers are stacked is formed.

7. The spot size converter according to claim 1, wherein the sectional area of the first and second core layers decreases in the direction from the first end toward the second end from the position where the sectional area of the first and second core layers is the maximum.

8. An optical transmitter, comprising:
   a substrate;
   a spot size conversion unit including
   a first cladding layer disposed on the substrate,
   a first core layer and a second core layer arranged side by side on the first cladding layer so as to extend from a first end which receives light along a direction from the first end toward a second end which outputs light,
   a third core layer which is disposed on the first cladding layer between the first and second core layers, is a member different from the first and second core layers, and extends to the second end along the direction from the first end toward the second end, and
   a second cladding layer disposed on the first, second, and third core layers; and
   a light generator disposed on the substrate and outputting light to the first end, wherein:
   sectional area of the first and second core layers increase in the direction from the first end toward the second end, and
   the third core layer is disposed so as to extend from the position, as an initial point, where the sectional area of the first and second core layers is the maximum to the second end in the direction from the first end toward the second end.

9. The optical transmitter according to claim 8, wherein the sectional area of the first and second core layers decreases in the direction from the first end toward the second end from the position where the sectional area of the first and second core layers is the maximum.

10. A method of manufacturing a spot size converter, comprising:
    forming a first core layer and a second core layer arranged side by side on a first cladding layer so as to extend from a first end along a direction from the first end toward a second end and forming a third core layer which is disposed on the first cladding layer between the first and second core layers, is a member different from the first and second core layers, and extends to the second end along the direction from the first end toward the second end, wherein sectional area of the first and second core layers increase in the direction from the first end toward the second end and the third core layer is formed so as to extend from the position, as an initial point, where the sectional area of the first and second core layers is the maximum to the second end in the direction from the first end toward the second end; and forming a second cladding layer disposed on the first, second, and third core layers.

11. The method of manufacturing a spot size converter according to claim 10, wherein, in forming the first core layer and the second core layer and the third core layer, the first core layer and second core layer are formed such that the sectional area of the first and second core layers decreases in the direction from the first end toward the second end from the position where the sectional area of the first and second core layers is the maximum.

* * * * *